United States Patent Office 3,424,958
Patented Jan. 28, 1969

3,424,958
APPARATUS AND METHOD FOR SIMULATING ELECTRICAL FAULT CONDITIONS IN A PROTECTIVE RELAY SYSTEM
Thomas A. Groat, 192 McMahon Ave.,
Kingston, Ontario, Canada
Filed Aug. 3, 1966, Ser. No. 569,875
Claims priority, application Canada, Mar. 31, 1966, 956,886
U.S. Cl. 317—262      30 Claims
Int. Cl. H02h 3/28, 7/20

ABSTRACT OF THE DISCLOSURE

An apparatus and method for simulating electrical fault conditions in a protective relay system comprising a potential source, a current source, control circuit means for controlling the phase angle between a voltage and a current applied to the relay system and for causing said voltage to change from a first value to a second value and said current to change from a first value to a second value in a particular sequence and a timing circuit for controlling the sequence of change of the current and voltage whereby fault conditions are simulated by feeding voltage and current to a relay under test with the phase angle between the voltage and current being controlled, the magnitude of the voltage and current being changed from first to second values and the sequence of change being controlled.

---

This invention relates to an apparatus and a method for simulating electrical fault conditions suitable for testing protective relay systems.

To protect costly electrical equipment from severe damage, in the event of internal or external fault, protective relay systems are used to detect abnormal conditions and to initiate action in order to isolate the faulted equipment from all sources of energy. To maintain a high degree of operating reliability from such a system, the relays should be calibrated periodically and the overall operation of the system should be checked. Protective systems such as these employ various types of relays such as, overcurrent, overvoltage, undervoltage, impedance, directions and D.C. auxiliary relays. Equipment to calibrate these relays has been available for some time, but an apparatus to check the overall operation of the system has not been readily available.

According to one aspect of the invention there is provided an apparatus for testing the characteristics of a relay system comprising means for controlling the phase angle between a voltage and a current applied to said relay system, means for causing said voltage to change from a first value to a second value and said current to change from a first value to a second value in a particular sequence, and means for controlling the sequence of change of said current and voltage.

According to another aspect of the invention there is provided a method of simulating fault conditions for testing a protective relay system comprising the steps of: feeding a voltage and a current to a relay under test, controlling the phase angle between said voltage and current, and causing the magnitude of said voltage and current to change from a first and second value and controlling the sequence of change.

Figure 1:
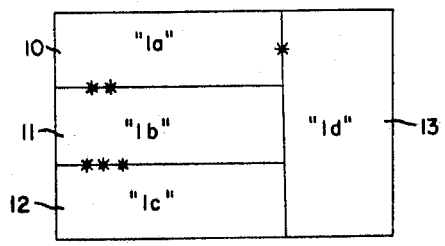
Figure 1A:
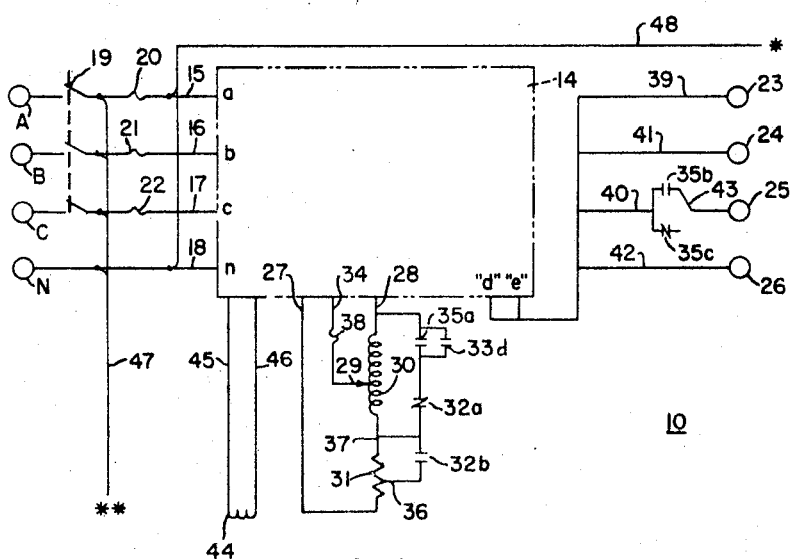
Figure 1B:
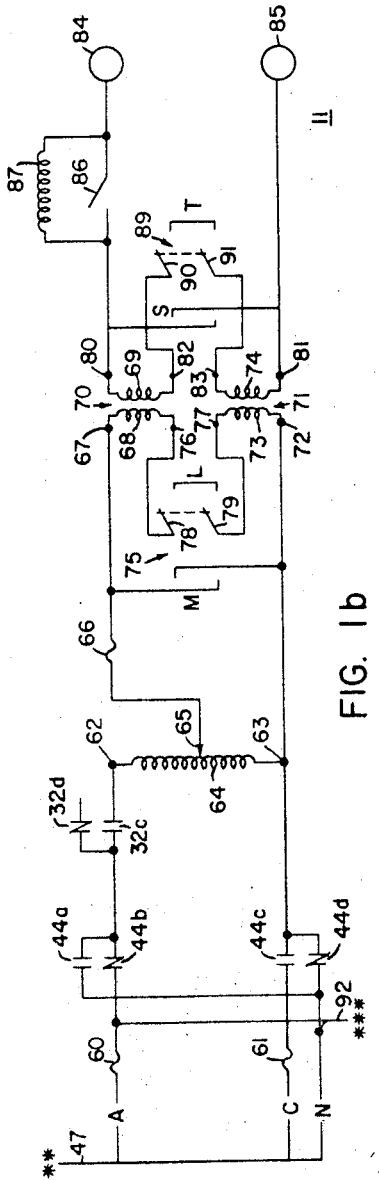
Figure 1C:
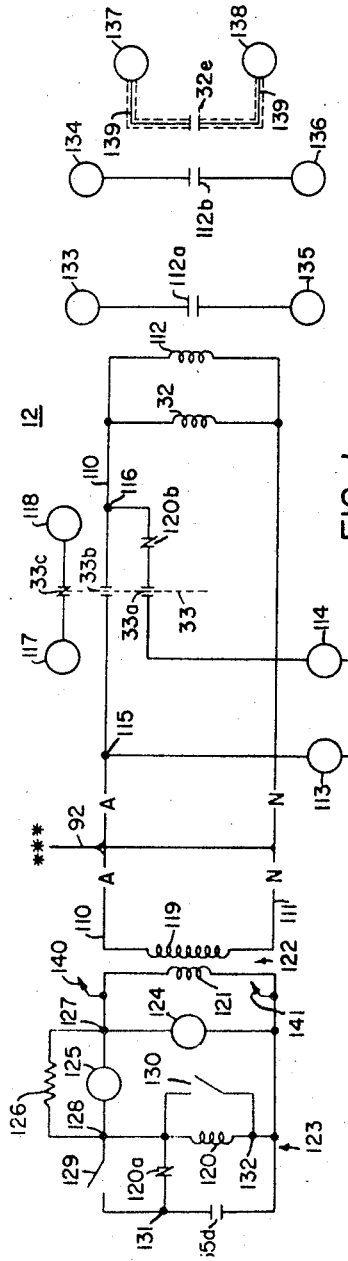
Figure 1D:
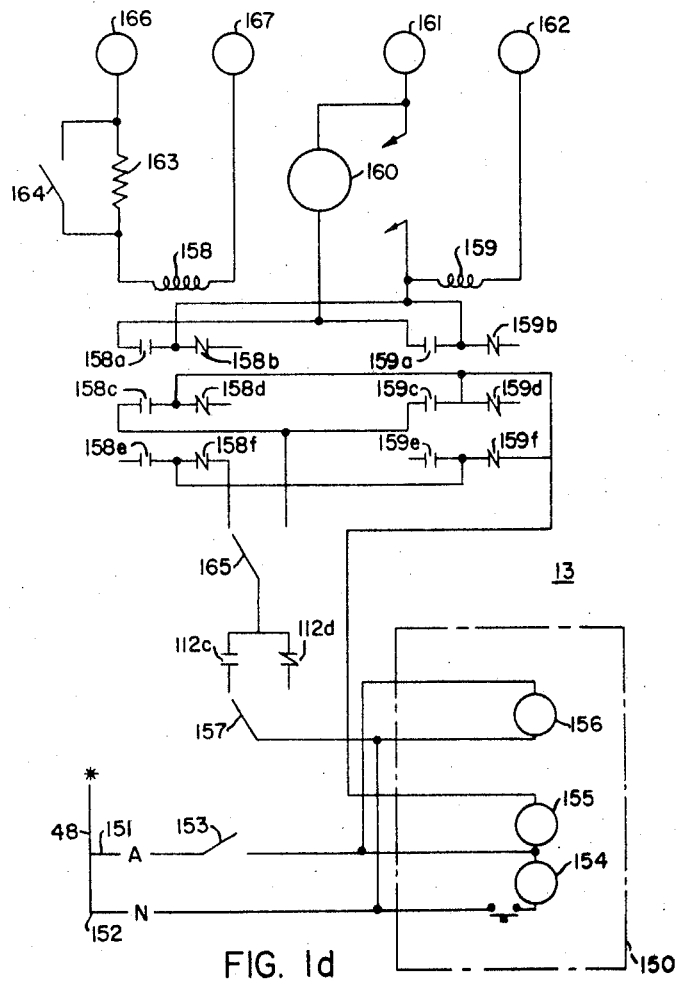
Figure 2:
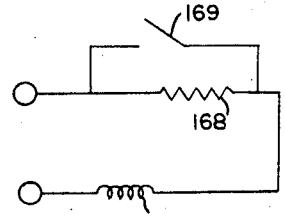
Figure 3:
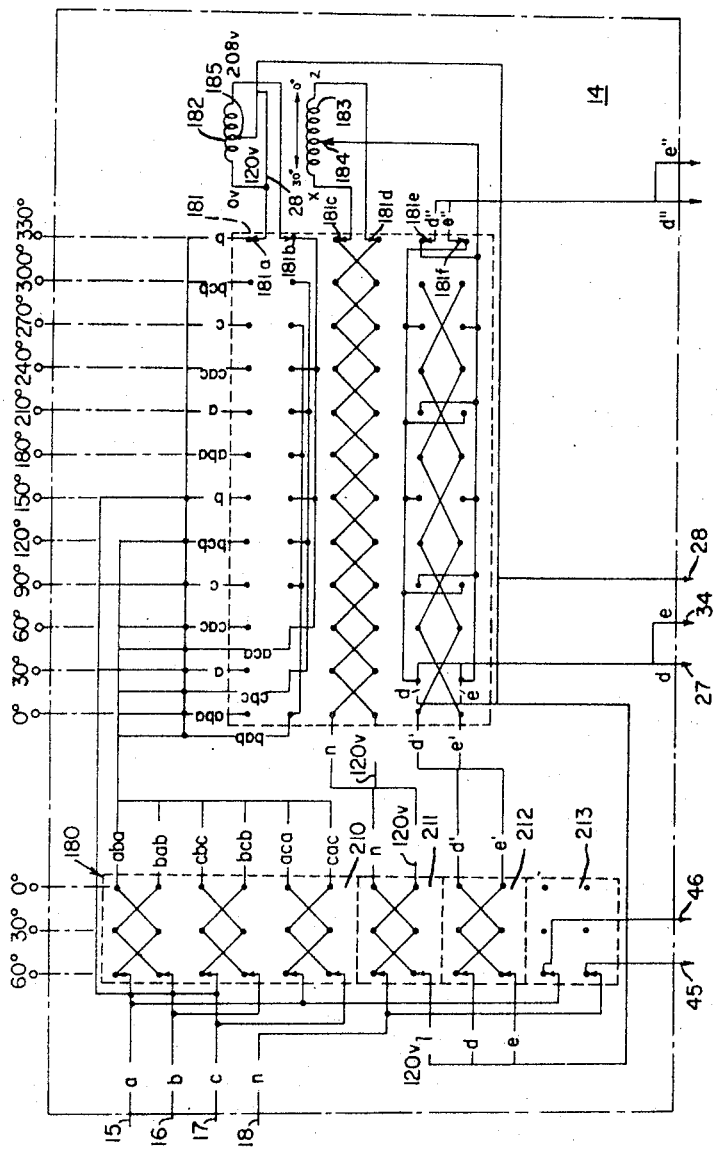
Figure 4:
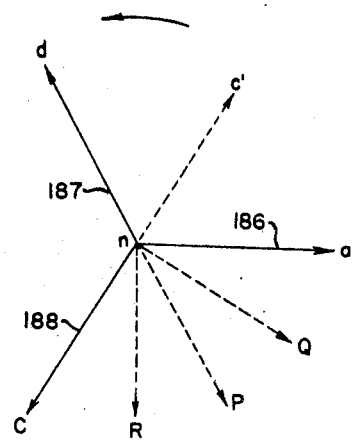
Figure 5:
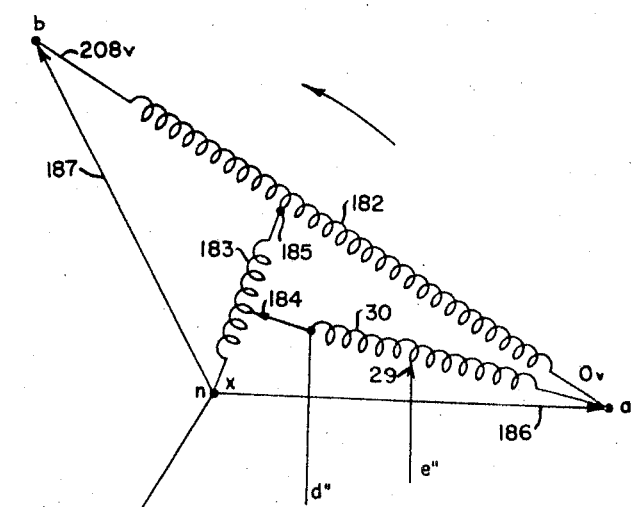
Figure 5A:
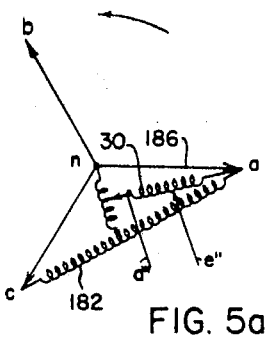
Figure 5B:
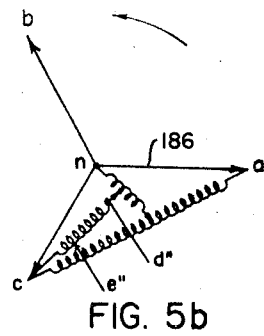
Figure 5C:
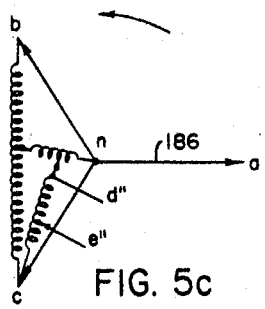
Figure 5D:
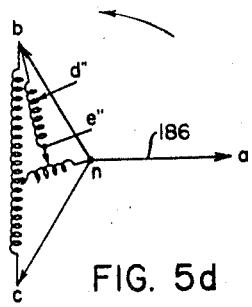
Figure 5E:
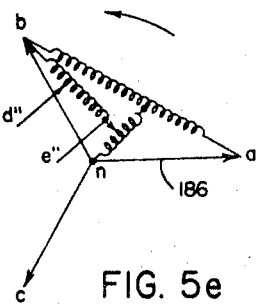
Figure 6:
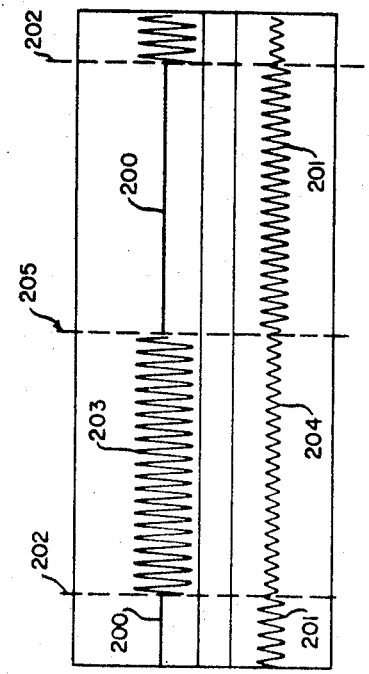

The invention will now be described by way of example, with reference to the accompanying drawings in which:

FIGURE 1 is a section diagram showing the relationship of FIGS. 1a, 1b, 1c and 1d, FIGURE 1a is a schematic diagram of the potential source circuit, FIGURE 1b is a schematic diagram of the current source circuit, FIGURE 1c is a schematic diagram of the control circuit, FIGURE 1d is a schematic diagram of the timing circuit, FIGURE 2 is a schematic diagram of the breaker position sensing circuit, FIGURE 3 is a schematic diagram of the phase angle selection and correction circuit, FIGURE 4 is a vector diagram of the three phase supply, FIGURE 5 is a vector diagram showing the relation of the phase shifting components, FIGURE 5a to 5e are vector diagrams with the phase shifting components showing various phase shifting angles, FIGURE 6 is a response curve of the relationship of the voltage and the current when simulating a fault.

The fault simulator described herein comprises four basis units, a potential source 10, a current source 11, a control circuit 12 and a timing circuit 13. For ease of description of the fault simulator the four basic units are represented as four sections forming part of a block as shown in FIG. 1. The asterisks indicate how these sections are connected together.

Referring to FIG. 1a, there is shown the circuit forming the potential source 10. This circuit comprises a phase angle selection and correction circuit 14 (schematically represented by FIG. 3) which will be described later. The potential source 10 is connected to a three phase 120/208 volt 10 amps supply. Phase one of the three phase supply represented by A, phase two by B, phase three by C and neutral by N. Phases A, B, C and neutral N are connected to a, b, c, and n of the phase angle selection and correction circuit 14 via leads 15, 16, 17 and 18 respectively. An on/off switch 19 is connected to leads 15, 16 and 17. These three leads also include fuses 20, 21 and 22 respectively.

The potential source 10 provides a control voltage in the range from 0 to 120 volts, rated 2 amps. A voltage of 120 volts is applied between leads 27 and 28 which connect across the series combination of variable transformer 30 and resistor 31. The 120 volt supply across leads 27 and 28 is taken from an auto-transformer (not shown in this figure) which in turn is connected across two phases of the three phase input supply, via switching arrangement. The parallel combination of normally open (N.O.) relay contact 35a and N.O. switch contact 33d is connected in series with a normally closed (N.C.) relay contact 32a. This combination of contacts 35a, 33d and 32a, is then connected in parallel with variable transformer 30. A 500 ohm register 31 having a 50 ohm tap 36 is connected between lead 27 and one end of variable transformer 30. An N.O. relay contact 32b is connected from tap 36 of resistor 31, to the junction 37 connecting variable transformer 30 and resistor 31. The N.O. relay contact 32b is also connected in series with the combination of N.O. relay contact 35a, N.O. switch contact 33d and N.C. relay contact 32a. A lead 34 provided with a fuse 38 is connected to the adjustable armature 29 of variable transformer 30.

The potential source 10 is provided with two outputs; one between terminals 23 and 24 and the other between terminals 25 and 26. Lead 39, which connects to terminal 23, and lead 40 which connects to terminal 25 via switch 43, are both connected to lead 34 via a switching arrangement in the phase angle selection and correction circuit 14. Leads 41 and 42 connect to output terminals 24 and 26 respectively and to lead 27 via switching arrangement in the phase angle selection and correction circuit 14. Lead 40 is provided with a switch 43 which can be placed in either two positions; one position completes the circuit through the normally open (N.O.) relay contact 35b and the other through a normally closed (N.C.) relay contact 35c. The purpose of switch 43 is to select a voltage that will go from 120 to 0 volts in one position or from 0 to 120 volts in the other position.

A relay coil 44 is connected between leads 45 and 46 and is operated by the phase angle selection and correction circuit 14. Energizing delay coil 44 changes the phase of the input voltage to the current source 11. A cable 47 comprising leads taped from phases A and C, and neutral N is provided for connection to the current source 11. A connection from phase A and neutral N is also provided and connects to the control circuit via cable 48.

Referring now to FIG. 1b, the current source 11, there is shown a cable 47 connecting phase A and C, and neutral N to the input of the circuit. Cable 92 connects phase A and the neutral N of the current source 11 to the timing circuit 12 (FIG. 1c). Referring to the current source 11, phase A is connected to terminal 62 of variable transformer 64 via fuse 60 and the series connected combination of N.C. relay contact 44b and N.O. relay contact 32c. Phase C connects to terminal 63 of variable transformer 64 via fuse 61 and N.O. relay contact 44c. Neutral N connects to terminal 63 via N.C. relay contact 44d and to terminal 62 via N.O. relay contact 44a and N.O. relay contact 32c. When relay coil 44 (FIG. 1a) energizes, the conditions of relay contact 44a, 44b, 44c and 44d are reversed. With the conditions of relay contacts 32c and 32d also reversed the current source is supplied from phase C and neutral N. The purpose of variable transformer 64 is to control the magnitude of the current. The slidable armature 65 of variable transformer 64 is connected to terminal 67 of the primary winding 68 of loading transformer 70. A fuse 66 is also connected to the adjustable armature 65 and terminal 67 to protect the circuit against accidental short circuits. Terminal 63 of variable transformer 64 is connected to terminal 72 of the primary winding 73 of loading transformer 71. Terminal 76 of primary winding 68 and terminal 77 of primary winding 73 connect to pole 78 and 79 respectively, of burden switch 75. Burden switch 75 is a double pole double throw switch and is used to series/parallel the primary windings 68 and 73 of loading transformers 70 and 71 respectively. When the poles 78 and 79 of burden switch 75 are placed in position M the primary windings are connected in parallel when placed in position L the primary windings are connected in series.

Terminal 80 of the secondary winding 69 of loading transformer 70 is connected to output terminal 84 via a reactor 87 or a switch 86 which is connected in parallel with reactor 87. Reactor 87 increases the circuit impedance to give a smooth current control when the impedance in the current coils of the relays under test are low. When switch 86 is closed reactor 87 is bypassed. Terminal 81 of secondary winding 74 is connected to output terminal 85. Terminal 82 of secondary winding 69 of loading transformer 70 and terminal 83 of secondary winding 74 of loading transformer 71 are respectively connected to poles 90 and 91 of current switch 89. Current switch 89 series/parallel the secondary windings of loading transformers 70 and 71. When current switch 89 is in position T the secondary windings are connected in series and when in position S the secondary windings are connected in parallel. The purpose of current switch 89 and burden switch 75 is to give a 0 to 12.5/25 volt output rated 15 amps or a 0 to 50 volt output rated 8 amps.

FIG. 1c shows the control circuit 12 which is connected across a 120 volt supply taken from cable 92 which connects to phase A and neutral N of the current source 11. The 120 volt supply is connected across relay coil 32 and 112 via lead 110 and 111. An N.O. switch contact 33b is also connected in lead 110. An external start output is provided between terminals 113 and 114. A switch (not shown) may be connected across terminals 113 and 114 to start a sequence when N.O. switch contact 33a is closed. Terminal 114 is connected to lead 110 at junction 116 via N.O. switch contact 33a in series with N.C. relay contact 120b. Terminal 113 is connected to lead 110 at junction 115. N.O. switch contact 33b is connected between junction 115 and 116. The combination of N.O. switch contact 33a, N.C. relay contact 12b and terminals 113 and 114 is connected in parallel with N.O. switch contact 33b. Terminals 117 and 118 provide the positive supply to operate the protective relays when simulating lightning strikes, line faults, etc. An N.C. switch contact 33c is connected across terminals 117 and 118 and opens the positive supply to the protective relays when setting up for simulation tests.

To provide transient and sustained faults when simulating for lightning strikes and permanent line faults a lock-out circuit 123 is provided. The input of the lock-out circuit is connected to the secondary winding 121 of step down transformer 122. The primary winding 119, of step down transformer 122, is connected across 120 volts supplied by cable 92. Phase A connects to one side of primary winding 119, via lead 110, and neutral N connects to the other side of primary 119 via lead 111. With 120 volts across the primary winding 119, 25 volts appears across the secondary winding 121. A lamp 124 is connected across the secondary winding 121 to indicate the condition of the circuit. A second lamp 125, connected in parallel with a 100 ohm resistor 126, connects to one side of secondary winding 121 at junction 127. The other side of lamp 125 and resistor 126 connect to a sustain/transient switch 129 and the junction of relay coil 120, switch 130 and relay contact 120a. Switch 129 provides for sustained operations of the simulated fault. With 25 volt across secondary winding 121, sufficient voltage is applied to relay coil 120 to cause it to energize relay coil 120 being energized delay contacts 120a and 120b "open." To de-energize relay coil 120 a switch 130 is connected in parallel therewith. When switch 130 is closed relay coil 120 is bypassed and contacts 120a and 120b close. When the circuit breaker of the office battery (not shown) is open and relay coil 35 (FIG. 2) is energized relay contact 35d, connected between terminals 131 and 132 close. Under this condition, if switch 130 is open (after having closed it for de-energizing relay coil 120) relay coil 120 will not energize as a short circuit is being provided via N.C. relay contact 120a and relay contact 35d in its closed condition.

An "auxiliary in" and an "auxiliary out" connection is provided between terminals 133–134 and 135–136 respectively. An N.O. relay contact 112a is connected across terminals 133 and 135 and an N.O. relay contact 112b between terminals 134 and 136. An H.F. connection is also provided across terminals 137 and 138. Normally open (N.O.) relay contact 32e is connected across terminals 137 and 138 via coaxial lead 139.

Referring to FIG. 1d there is shown the timing circuit 13. This circuit is provided to measure the timing of the opening and closing of the contacts of the protective relays when their coil is energized or de-energized. A supply of 120 volts is fed to the time totalizer 150 (forming part of the timing circuit 113) via leads 151 and 152 which are connected to phase A and neutral N, respectively. The time totalizer 150 comprises a motor 156, a timer clutch 155 and a reset solenoid 154. The motor 156 is controlled by on/off switch 153 which is connected in lead 151. The time totalizer utilized in this circuit can measure to an accuracy of 0.01 second. The motor 156 is normally running when the timer clutch 155 is energized. A pointer associated with clutch 155 records the operating time of the contact of the relay under test. De-energizing the clutch stops the pointer. The pointer can then be reset to zero by means of reset solenoid 154. The timing sequence is controlled by relay contacts 112c and 112d, timer clutch 155, and relay 158 or 159. Pickup or dropout time measurements are selected by clutch 157 and controlled by relay coil 112 and contact 112c and 112d. Contact switch 165 senses N.O. (normally open) and N.C. (normally closed) contact conditions.

To operate relay coil 159, the 25 v. A.C. supply across the secondary winding 121 of step-down transformer 122 (shown in FIG. 1c) is applied across terminals 161 and 162. This is effected through connections 140 and 141 across secondary winding 121. Lamp 160 is "on" when contact 158a or 159a is closed and thereby indicates that relay coil 158 or 159 is energized. In order to operate relay coil 158 an external 125/250 volt D.C. supply is connected across terminals 166 and 167. Switch 164 selects the appropriate voltage for relay coil 158. When switch 164 is open the voltage is dropped to the required value by resistor 163. When switch 164 is closed resistor 163 is bypassed and the voltage applied across terminals 166 and 167 appears across relay coil 158.

Referring to FIG. 2 there is shown a circuit for sensing the position of the office supply circuit breaker. In order to perform fault simulation tests it is necessary to determine when the circuit breaker is closed or open. Relay coil 35 has a 110 v. D.C. coil and is connected in series with the parallel combination of resistor 168 and switch 169. Where 250 v. D.C. is the breaker control voltage switch 169 is open, and the necessary voltage drop is developed across resistor 168. When the circuit breaker from the office supply (not shown) is closed relay coil 35 is energized. When the circuit breaker is open relay coil 35 is de-energized.

In FIG. 3 there is shown the phase angle selection and correction circuit 14. When testing directional relays it is required to have a potential of variable magnitude, a current of variable magnitude and means for varying the phase angle between the current and potential. This circuit provides a first and second switching means for changing the phase relationship of the voltage and the current in the coil of the relay under test. The three phase four wire supply comprising phases A, B, and C and neutral N are reperesented here as phases, a, b, and c and neutral n, and connected to the input of via leads 15, 16, 17 and 18 respectively. The phase angle correction switch 180 is a three deck, four poles per deck, three position rotary tap switch. The input leads 15, 16, 17 and 18 are connected to nine poles of switch 180. The other three poles of this switch are connected to a 120 volt lead, and the d and e leads which are in turn connected to leads 27 and and 34 respectively, of the potential source 10. Three positions are provided by switch 180 and these are indicated as 0°, 30° and 60°. As shown in FIG. 3 the switch is in the 60° position. In order to obtain proper control of phase shifting, there is also provided a phase angle selection switch 181. This switch is a six deck, one pole per deck, twelve position rotary tap switch. The phase angle selection switch 181 is divided into three sections each containing two decks and a pair of poles. A 0–208 volt auto-transformer 182, having a tap 185 at 120 volts is connected across poles 181a and 181b forming part of the first section. As shown in FIG. 3 the 0 volt connection of auto-transformer 182 is connected to pole 181a, and the 208 volt connection is connected to pole 181b. The 120 v. tap 185 also connects to pole 181a. Poles 181a and 181b may be positioned in any of the twelve positions available and designated as 0° to 330° positions, in 30° steps. The terminals of these twelve positions are connected to three sets of terminals, designated by block 210, of the phase angle correction switch 180 and their associated poles. These terminals and poles are connected to phase a, b and c. These phases are connected to the phase angle correction switch 180 to form a combination of phases as indicated by the designations, aba, bab, cbc, bcb, aca, and cac. These connections plus the connections to phases a, b, c, are connected to the terminals of the terminals of the first section of the phase angle selection switch 181.

A first variable transformer 183, having an adjustable armature 184 is connected to poles 181c and 181d forming part of the second section of switch 181. The end of variable transformer 183 designated x is connected to pole 181c, and the end designated z is connected to pole 181d. The connections of this second section of switch 181 are connected to neutral N of the input supply and the 120 volt tap 185 of auto-transformer 182 via the fourth set of terminals, designated by block 211, of the phase angle correction switch 180.

Referring to FIG. 3 and FIG. 1a, the third section of the phase angle selection switch 181 comprising poles 181e and 181f connects to the output terminals of the potential source 10 via leads d" and e". Six of the twelve sets of terminals of the third section of switch 181 are connected to lead 27 and 34 of the potential source 10 via leads d and e. These six sets of terminals are spaced every 60°. Leads d and e are also connected to the poles of the fifth set of terminals, designated by block 212, of the phase angle correction switch 180. The terminals of this fifth block 212 are connected to the other six sets of terminals of the third section of switch 181 and are also spaced 60° apart. This conection is made through leads d' and e'. Switch 180 is equipped with a further set of terminals, designated by block 213, of which only two terminals are connected for operation. The poles of this set are connected to phase a and neutral n. The terminals are connected to leads 45 and 46 which connect across relay coil 44. When switch 180 is in the 60° position 120 volts is applied across relay coil 44 thereby reversing the conditions of relay contacts 44a, 44b, 44c and 44d. By reversing these contacts the current source 11 derives its input between phase C and neutral N instead of phase A and neutral N.

OPERATION

The operation of the phase angle selection and correction circuit will be described with reference to FIGS. 4, 5 and 5a through 5e.

Referring firstly to FIG. 4 there is shown a vector representation of the three phase, four wire, 120/208 volt supply. Phases a, b and c are represented here as vectors 186, 187 and 188 respectively each being 120 volts. The phases are spaced 120° apart and connected to neutral n. The voltage across any two phases, for example a–b, is 208 volts.

By switching the test voltage relative to the three phases (shown in FIG. 4) it is possible to vary the phase of the voltage in known steps once the phase of the current is established. In FIG. 5 there is shown the method and components employed in the phase angle selection and correction circuit for obtaining control of the phase relationship between the voltage and the current. With switch 180 and 181 in their respective 0° positions the components forming part of this phase shifting circuit are connected to the three phase system as shown. Auto-transformer 182 is connected across phase a and b with its 0 volt end on phase a and its 208 volt end on phase b. A first variable transformer 183 is always connected between tap 185 and neutral n. The test voltage is taken across lead d" and e". One end of a second variable transformer 30 is always connected to the 0 volt end of auto-transformer 182.

The operation of this circuit will be described by way of examples which illustrate the method of controlling the phase angle of the test potential with relation to a reference voltage, in this case the a–n voltage illustrated by vector 186.

*Example 1 (FIG. 5)*

Phase angle correction switch 180 on 0°.
Phase angle selection switch 181 on 0°.
With the switch in this position auto-transformer 182 is connected across phases a and b, the voltage across auto-transformer 182 being 208 volts. One end of variable transformer 183 is connected to the 120 volt tap 185 of auto-transformer 182. The other end is connected to neutral $n$. Variable transformer 30 is connected between phase $a$ and the adjustable armature 184 of variable transformer 183. The magnitude of the voltage is controlled by adjustable armature 29 of variable transformer 30. With switches 180 and 181 at their respective 0° position, it is possible to vary the phase of the test potential present between leads $d''$ and $e''$, from 0° to 30° by adjusting armature 184. When armature 184 is at position $x$ the test potential is in phase with the $a-n$ voltage 186. When armature 184 is at position $z$ the test potential lags the $a-n$ voltage (vector 186) by 30°. Thus with switches 180 and 181 at their respective 0° position we can vary the phase of the test potential from 0° to 30° lagging the $a-n$ voltage.

*Example 2 (FIG. 5a)*

Phase angle correction switch 180 on 0°.
Phase angle selection switch 181 on 30°.
The phase of the test potential across $d''-e''$ leads the phase of $a-n$ voltage 186 by an angle between 0° and 30°.

*Example 3 (FIG. 5b)*

Phase angle correction switch 180 on 0°.
Phase angle selection switch 181 on 60°.
The phase of the test potential across $d''-e''$ leads the phase of the $a-n$ voltage 186 by an angle adjustable between 30°–60°.

*Example 4 (FIG. 5c)*

Phase angle correction switch 180 on 0°.
Phase angle selection switch 181 on 90°.
The phase of the test potential across $d''-e''$ leads the phase of the $a-n$ voltage 186 by an angle adjustable between 60°–90°.

*Example 5 (FIG. 5d)*

Phase angle correction switch 180 on 0°.
Phase angle selection switch 181 on 120°.
The phase of the test potential across $d''-e''$ leads the phase of the $a-n$ voltage 186 by an angle adjustable between 90°–120°.

*Example 6 (FIG. 5e)*

Phase angle correction switch 180 on 0°.
Phase angle selection switch 181 on 150°.
The phase of the test potential across $d''-e''$ leads the phase of the $a-n$ voltage 186 by an angle adjustable between 120°–150°.

By reversing the test voltage across $d''-e''$ (displacing it by 180°) the phase angle of the test voltage will also be displaced i.e. FIG. 5a, the test potential across $d''-e''$ will lead the $a-n$ voltage 186 by an angle adjustable between 180°–210°.

If the current coils of the relays under test were pure resistance then the current in these coils would be in phase with the $a-n$ voltage. These coils however are not pure resistance but a combination of pure resistance plus inductance. Thus, if the $a-n$ voltage is used to supply the current to these coils, then the current in the relay coils will not be in phase with the $a-n$ voltage but lie somewhere between 0° and 90° lagging the $a-n$ voltage. In order that the test potential across $d''-e''$ be in phase with the current in the coil of the relay under $d''-e''$ switch 180 is provided with 0°, 30°, 60° shift positions such that the test potential voltage may be shifted lagging the $a-n$ voltage 0°, 30°, 60°.

If the phase angle correction switch 180 and the phase angle selection switch were placed to their respective 0° positions, then by using variable transformer 183 the test potential may be varied from 0° to 30° lagging the $a-n$ voltage. Therefore if the relay current lags the $a-n$ voltage between 0° to 30° then the 0° position on switch 181 may be made 0° with respect to the relay current by adjusting variable transformer 183 until the test potential across $d''-e''$ is in phase with the relay current. This adjustment being made it is now possible to adjust the phase of the voltage in 30° steps, as indicated on switch 181, the test potential leading the relay current. If the relay current was to lie between 30° and 60° (Q–P FIG. 4) behind the $a-n$ voltage then switch 180 would be positioned to 30° and with switch 181 in the 0° position variable transformer 183 would be adjusted to bring the test potential in phase with the relay current. By placing switch 180 in the 30° position the connection of auto-transformer 182 is reversed with relation to phase $a$ and $b$ thereby displacing the variable transformer into the 30°, 60° position (P–Q FIG. 4) with relation to the $a-n$ voltage.

For testing a relay in which the current lies between 60° to 90° (P–R FIG. 4) behind the $a-n$ voltage, switch 180 would be positioned to its 60° position. When the switch is in the 60° position, the $c-n$ voltage is applied to the current source 11 via relay contacts 44c and 44a which are now closed (FIG. 1b). Thus $n-c'$ voltage (FIG. 4) supplies the current and leads the $a-n$ voltage by 60°. The relay current lags the $n-c'$ voltage by 60° to 90° thus lagging the $a-n$ voltage between 0° and 30°. Since variable transformer 183 can lag the test potential from 0° to 30° with respect to the $a-n$ voltage, the test potential can be shifted in phase with the relay current lying 60° to 90° behind the $n-c'$ voltage.

To calibrate a relay, switch 33 is placed to the "calibrate" position, thus relay contact 33b is in its "closed" position. By completing this circuit, relay coils 32 and 112 are energized thereby reversing the positions of their respective contacts. With contact 32b in the "closed" position, the end (that closest to junction 37) of variable transformer 30 is connected to lead 27 via the 50 ohm tap 36 of resistor 31. This is necessary to provide a zero voltage when the tap on variable transformer 30 is at the bottom. The potential is then set to 120 volts feeding the relay potential coils. By means of the phase angle selection switch 181, phase angle correction switch 180 and variable transformer 183, the phase of the voltage fed to the relay potential coils may be adjusted to give the desired phase relation with the current of the relay coil. The relay can then be calibrated in the normal manner.

The timing circuit 13 is connected to the relays under test to measure the timing and sense the contact position. If D.C. relays are used the operating voltage is supplied between terminals 133, 134, 135 and 136 (FIG. 1c). These are the auxiliary out and auxiliary in terminals.

For simulating fault conditions such as lightning strike, permanent line fault, bad insulator, line down, etc., the following operation is effected. The current and potential is connected to protective relay scheme. The positive supply is taken through terminals 117 and 118 having an N.C. switch contact 33c connected therebetween. This contact is closed when switch 33 is in the operate position and open when the switch is in the calibrate position.

In order to perform fault simulation tests it is necessary to determine if the circuit breaker of the station battery is closed or open. The circuit breaker sensing circuit (FIG. 2) is provided for this purpose. When the breaker is closed relay coil 35 energizes and N.O. relay contact 35a closes thereby shorting out variable transformer 30. With switch 33 in the "off" position the output voltage equals the input voltage since variable transformer 30 is shorted out. When switch 33 is placed in the "operate" position relay coil 32 energizes, contacts 32a and 32b transfer and the output voltage drops to the setting on variable transformer 30 since relay contact 32a is now open. Switch contact 33d also closes when switch 33 is in "operate" so that when the circuit breaker trips and relay coil 32 and 35 de-energize the output voltage will then rise to equal the input voltage.

Referring to FIG. 6 there is shown the voltage and current response curves representing when simulating transient and sustained faults. With switch 33 in the "off" position and the circuit breaker "closed" (relay coil 35 energized) the voltage response 201 is at 120 volts RMS and the current response 200 is at 0 amps. At sequence 202 switch 33 is placed to the "operate" position. Contact 33b closes, relay coil 32 energizes and contact 32a opens transferring the output voltage to variable transformer 30. Thus the output voltage falls to the setting of variable transformer 30 designated by numeral 204 (as illustrated 60 v. RMS).

Referring to FIG. 6, there is shown the relationship of two values of voltage and current for simulating fault conditions both for transient and sustained operations. To obtain these operations there is provided as part of FIG. 1c a lock-out circuit 123. When the fault simulator is "on" 25 v. A.C. is applied to relay coil 120 thereby opening relay contacts 120a and 120b. If contact 120b is open when switch 33 is placed in the "operate" position relay coils 32 and 112 will not energize. With switch 33 in the "off" position and the circuit breaker of the office battery closed relay coil 35 of the breaker position circuit will be energized. Relay contact 35a is closed and variable transformer 30 is shorted out. The current 200 (FIG. 6) is at 0 amps and the voltage 201 is at 120 v. RMS. By operating switch 130, of the lock-out circuit, there is provided a short for the relay coil 120 (FIG. 1c) causing contacts 120a and 120b to close and lamp 125 to light. Releasing a first switch 130, relay coil 120 remains de-energized since the coil remains shortetd out via closed contact 120a and closed contact 35d. To simulate a fault condition switch 33 is placed to its "operate" position. The magnitude of the voltage and current is illustrated at position 202 on FIG. 6. Relay coil 32 and 112 energize and relay contact 32a opens releasing the control of the voltage to the variable transformer 30 illustrated in FIG. 6 as 60 v. RMS and designated 204. Relay contact 32c closes and the current through the relay coil of the relay under test increases to 25 amps. RMS, as designated by numeral 203, simulating a faulty condition. When this increase in current and decrease in voltage occurs the protective relay operates and trips the circuit breaker of the office battery. The circuit breaker having tripped, de-energizes relay coil 35, and consequently opening relay contact 35d which in turn causes relay coil 120 to energize and relay contact 120a and 120b to open. Relay coils 32 and 112 de-energize closing contact 32a and shorting variable transformer 30 via switch contact 33d and relay contact 32a. All this procedure takes place at sequence 205 (FIG. 6) returning the current to 0 amps and the voltage to 120 v. RMS. If the circuit breaker recloses, the sequence from position 202 to 205 will not repeat since relay coil 120 is energized and contacts 120a and 120b being in their "open" position.

For sustained operations of the fault simulator a second switch 129 is closed, such that each time the circuit breaker closes relay coil 120 is de-energized allowing simulation sequence to occur.

I claim,

1. Apparatus for testing the characteristics of a relay system comprising means for controlling the phase angle between a voltage and a current applied to said relay system, means for causing said voltage to change from a first value to a second value and said current to change from a first value to a second value in a particular sequence, and means for controlling the sequence of change of said current and voltage.

2. Apparatus for testing the characteristics of a relay system comprising means for controlling the phase angle between a voltage and a current applied to said relay system, means for causing the magnitude of said voltage to change between a first and second value and simultaneously causing the magnitude of said current to change between a first and second value, and means for controlling the sequence of change of said voltage and current.

3. Apparatus as claimed in claim 2 wherein said means for controlling the phase angle between a voltage and a current comprises a first switching means capable of coarsely selecting the phase relationship of said voltage and said current, adjustable means for changing the phase of said voltage whereby the difference in phase between said voltage and current becomes zero, and a second switching means capable of again changing the phase relationship of said voltage and current so that said voltage leads said current.

4. Apparatus as claimed in claim 3 wherein said first switching means includes a switch capable of displacing said voltage and current relative to the phase of a reference voltage, said switch having a first, second and third position, each corresponding to a different phase relationship between said voltage and current.

5. Apparatus as claimed in claim 4 wherein said voltage is in phase with said reference voltage when said switch is in said first position.

6. Apparatus as claimed in claim 4 wherein said voltage lags said reference voltage by 30 degrees when said switch is in said second position.

7. Apparatus as claimed in claim 4 wherein said voltage is in phase with said reference voltage and said current is displaced to lag said reference voltage from 0 to 30 degrees when said switch is in said third position.

8. Apparatus as claimed in claim 3 wherein said adjustable means is a variable transformer of changing said phase relationship in 30 degree steps.

9. Apparatus as claimed in claim 3 wherein said second switching unit is a twelve position switch having a first, second and third pair of poles and capable of changing said phase-relationship in twelve degree steps.

10. Apparatus as claimed in claim 9 wherein an auto-transformer having a tap thereon is connected across said first pair of poles, said first pair of poles capable of connection between any two phases of a three phase supply.

11. Apparatus as claimed in claim 9 wherein a first variable transformer is connected across and second pair of poles, each pole of said second pair of poles capable of connection to a tap on an auto-transformer or a neutral connection of a three phase supply, said first variable transformer having an adjustable armature, said adjustable armature being connected to one end of a second variable transformer.

12. Apparatus as claimed in claim 10 wherein a first variable transformer is connected across said second pair of poles, each pole of said second pair of poles capable of connection to a tap on an auto-transformer or a neutral connection of a three phase supply, said first variable transformer having an adjustable armature, said adjustable armature being connected to one end of a second variable transformer.

13. Apparatus as claimed in claim 9 wherein said third set of poles is connected between an adjustable armature of a first variable transformer and an adjustable armature of a second variable transformer, said second variable transformer having one end connected to said adjustable armature of said first variable transformer and an other end connected to one end of an auto-transformer.

14. Apparatus as claimed in claim 10 wherein said third set of poles is connected between an adjustable armature of a first variable transformer and an adjustable armature of a second variable transformer, said second variable transformer having one end connected to said adjustable armature of said first variable transformer and an other end connected to one end of an auto-transformer.

15. Apparatus as claimed in claim 2 wherein said means for causing the magnitude of said voltage and current to change between a first and second value comprises a control circuit for operating a relay circuit associated with a voltage and current source.

16. Apparatus as claimed in claim 15 wherein said relay circuit connected to a voltage and current source includes one or more relay contacts connected in parallel with a variable voltage transformer, at least one of said one or more relay contacts being normally open, and one or more relay contacts connected in series with a variable current transformer and having at least one contact which is normally open.

17. Apparatus as claimed in claim 2 wherein said means for controlling the sequence of change of said voltage and current includes a lock-out circuit which provides a sustained or transient operation of said change in voltage and current.

18. Apparatus as claimed claim 17 wherein said lock-out circuit comprises a relay coil connected across a supply, a first switch connected across said relay coil and a second switch in series with a normally open relay contact and also connected across said relay coil.

19. Apparatus as claimed in claim 18 wherein said first switch when open causes said voltage and current to change from a first value to a second value.

20. Apparatus as claimed in claim 18 wherein said second switch when closed provides sustained operations of said change in voltage and current.

21. A method of simulating conditions for testing a protective relay system comprising the steps of:
 (i) feeding a voltage and a current to a relay under test,
 (ii) controlling the phase angle between said voltage and current, and
 (iii) causing the magnitude of said voltage and current to change from a first and second value and controlling the sequence of change.

22. A method as claimed in claim 21 wherein controlling phase angle between said voltage and current comprises:
 (i) sensing the phase of the current in the coil of the relay under test,
 (ii) aligning the phase of said voltage with the phase with said current in the coil of the relay under test, and
 (iii) controlling the phase of said voltage in 30 degree steps, said voltage leading said current in the coil of the relay under test.

23. A method as claimed in claim 22 wherein aligning said voltage in phase with the phase of said current in the coil of the relay under test comprises first switching means for coarsely selecting the proper phase relationship between said voltage and current and variable transformer means for positioning said voltage in phase with the phase of said current in said relay coil.

24. A method as claimed in claim 23 wherein said first switching means includes a switch capable of displacing said voltage and current relative to the phase of a reference voltage, said switch having a first, second and third position, said voltage being in phase with said reference voltage when said switch is in said first position, said voltage lagging said reference voltage by 30 degrees when said switch is in said second position, and said voltage being in phase with said reference voltage and said relay coil current being displaced to lag said reference voltage between 0 to 30 degrees when said switch is in said third position.

25. A method as claimed in claim 22 wherein said controlling the phase of said voltage in 30 degree steps comprises second switching means connected to a three phase system and operable to cause said voltage to lead the phase of said coil current in 30 degree steps.

26. A method as claimed in claim 25 wherein said second switching means is a twelve position switch having a first, second and third pair of poles.

27. A method as claimed in claim 25 wherein said auto-transformer has two ends and a tap, the first of said two ends being connected to a first pole of a first set of poles of said second switch, the second end of said auto-transformer connected to a second pole of said first set of poles, a first variable transformer having two ends and an adjustable armature, one of said ends of said first variable transformer being connected to the tap of said auto-transformer through a first pole of a second set of poles of said second switch and the other end of said first variable transformer being connected to a neutral connection of said three phase supply through a second pole of said second set of poles, a second variable transformer having two ends and an adjustable armature, the end of said adjustable armature of said second variable transformer being connected to a first pole of a third set of poles of said second switch, the first end of said two ends of said second variable transformer being connected to the variable armature of said first variable transformer and to a second pole of said third set of poles of said second switch and the second end of said second variable transformer being connected to the first end of said auto-transformer.

28. A method as claimed in claim 26 wherein said auto-transformer has two ends and a tap, the first of said two ends being connected to a first pole of a first set of poles of said second switch, the second end of said auto-transformer connected to a second pole of said first set of poles, a first variable transformer having two ends and an adjustable armature, one of said ends of said first variable transformer being connected to the tap of said auto-transformer through a first pole of a second set of poles of said second switch and the other end of said first variable transformer being connected to a neutral connection of said three phase supply through a second pole of said second set of poles, a second variable transformer having two ends and an adjustable armature, the end of said adjustable armature of said second variable transformer being connected to a first pole of a third set of poles of said second switch, the first end of said two ends of said second variable transformer being connected to the variable armature of said first variable transformer and to a second pole of said third set of poles of said second switch and the second end of said second variable transformer being connected to the first end of said auto-transformer.

29. A method as claimed in claim 21 wherein causing the magnitude of said voltage and current to change between a first and second value and controlling sequence of change comprises a control circuit for controlling a relay circuit connected to a voltage and current source said relay circuit being operable by a lock-out circuit for causing said voltage and current to rise and fall to predetermined values, said lock-out circuit including a first and second switch.

30. A method as claimed in claim 29 wherein said first switch of said lock-out circuit when open causes said voltage and current to change from a first value to a second value, and wherein said second switch of said lock-out circuit provides sustained operations of said change in voltage and current.

References Cited

UNITED STATES PATENTS

| 2,898,548 | 8/1959 | Slamecka et al. | 324—28 |
| 3,286,129 | 11/1966 | Gagniere | 317—31 |
| 3,373,350 | 3/1968 | Reece | 324—28 |

JOHN F. COUCH, *Primary Examiner.*

R. V. LUPO, *Assistant Examiner.*

U.S. Cl. X.R.

317—31, 33; 324—28